US008645931B2

(12) United States Patent
Pratt

(10) Patent No.: US 8,645,931 B2
(45) Date of Patent: Feb. 4, 2014

(54) MOVING STATIC ELEMENTS BETWEEN A DOCUMENT AND AN EXTERNAL RESOURCE FILE IN A DOCUMENT EDITOR

(75) Inventor: Allan K. Pratt, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 1611 days.

(21) Appl. No.: 11/266,990

(22) Filed: Nov. 4, 2005

(65) Prior Publication Data

US 2007/0168944 A1   Jul. 19, 2007

(51) Int. Cl.
*G06F 9/45* (2006.01)
(52) U.S. Cl.
USPC ........... 717/141; 717/136; 717/140; 717/145; 717/151; 717/152; 717/159
(58) Field of Classification Search
USPC .......................................................... 717/110
See application file for complete search history.

(56) References Cited

U.S. PATENT DOCUMENTS

| | | | | |
|---|---|---|---|---|
| 5,434,776 | A * | 7/1995 | Jain .................................. | 704/8 |
| 5,561,800 | A * | 10/1996 | Sabatella ....................... | 719/331 |
| 5,678,039 | A * | 10/1997 | Hinks et al. ........................... | 1/1 |
| 5,864,866 | A | 1/1999 | Henckel et al. | |
| 6,035,121 | A * | 3/2000 | Chiu et al. ..................... | 717/141 |
| 6,151,022 | A * | 11/2000 | Alshibani et al. ............. | 715/788 |
| 6,252,589 | B1 * | 6/2001 | Rettig et al. ................... | 715/703 |
| 6,370,538 | B1 * | 4/2002 | Lamping et al. .............. | 707/102 |
| 6,499,137 | B1 | 12/2002 | Hunt | |
| 6,792,606 | B2 | 9/2004 | Halter et al. | |
| 6,802,059 | B1 * | 10/2004 | Lyapustina et al. ........... | 717/143 |
| 7,013,289 | B2 * | 3/2006 | Horn et al. ................... | 705/14.51 |
| 7,024,365 | B1 * | 4/2006 | Koff et al. .................... | 704/270.1 |
| 7,441,184 | B2 * | 10/2008 | Frerebeau et al. ............. | 715/234 |
| 7,784,026 | B1 * | 8/2010 | Wong ............................. | 717/109 |
| 2001/0044809 | A1 * | 11/2001 | Parasnis et al. ............... | 707/513 |
| 2002/0107684 | A1 * | 8/2002 | Gao ................................ | 704/4 |
| 2002/0133806 | A1 * | 9/2002 | Flanagan et al. .............. | 717/123 |
| 2002/0143774 | A1 * | 10/2002 | Vandersluis ..................... | 707/10 |
| 2002/0162093 | A1 * | 10/2002 | Zhou et al. .................... | 717/130 |

(Continued)

OTHER PUBLICATIONS

Bertenshaw et al, "How often do you delete code", http://discuss.fogcreek.com/joelonsoftware/default.asp?cmd=show&ixPost=8583, first posted on May 21, 2002., pp. 1-9.*

(Continued)

*Primary Examiner* — Emerson Puente
*Assistant Examiner* — Charles Swift
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to externally stored static elements for a document in a document editor and provide a method, system and computer program product for moving static elements for a document between an external file and the document in a document editor. A data processing system for moving static elements for a document between an external file and the document in a document editor can include an automated de-externalization and re-externalization processor coupled to a document editor. The automated de-externalization and re-externalization processor can include program code enabled both to replace static elements in a subject document with static element references while storing replaced static elements in entries in an external file, and also to replace static element references in the subject document with corresponding static elements stored in the entries in the external file.

9 Claims, 2 Drawing Sheets

(56) References Cited

U.S. PATENT DOCUMENTS

| | | | |
|---|---|---|---|
| 2003/0078960 A1* | 4/2003 | Murren et al. | 709/203 |
| 2003/0237051 A1* | 12/2003 | LaMarca et al. | 715/513 |
| 2004/0031015 A1* | 2/2004 | Ben-Romdhane et al. | 717/107 |
| 2004/0139176 A1* | 7/2004 | Farrell et al. | 709/220 |
| 2006/0090154 A1* | 4/2006 | Bustelo et al. | 717/110 |
| 2007/0094289 A1* | 4/2007 | Vandersluis | 707/101 |
| 2008/0154866 A1* | 6/2008 | Beyer et al. | 707/3 |

OTHER PUBLICATIONS

Bertenshaw et al, "How often do you delete code", May 21, 2002, http://discuss.fogcreek.com/joelonsoftware/default.asp?cmd=show&ixPost=8583, first posted on May 21, 2002., pp. 1-9.*

Harm Sluiman, *Round Tripping Generated Text Based* Files, IBM RD n435 Jul. 2000 Article 173, p. 1310.

* cited by examiner

US 8,645,931 B2

MOVING STATIC ELEMENTS BETWEEN A DOCUMENT AND AN EXTERNAL RESOURCE FILE IN A DOCUMENT EDITOR

BACKGROUND OF THE INVENTION

1. Field of the Invention

The present invention relates to the field of document editing and more particularly to processing static elements referenced within a document and stored externally to the document.

2. Description of the Related Art

Document editing relates to the creation, modification and persistence of a document. Documents can range from pure binary, hex and text files to complex compositions of multimedia elements and live links to other resources, for example Web pages. Document editing ordinarily involves loading a portion if not the entirety of a document in memory, rendering the document within a view in a host computing device, and permitting the addition of, deletion from and modification to data in the document through the view in the host computing device.

Document editors, particularly text editors, have particular application to the field of code development. In code development, code developers utilize the text editor to edit source code files. The source code files ultimately can be compiled into object code which in turn can be included as part of an application. In the field of code development, resources can be utilized in the source code for presentation or use in the resulting application. Examples include static user interface elements such as labels, help text or menu text. Most often, static elements are hard coded within the source code itself. Consequently, modifying the static elements of a computer program in many cases can require the modification of the source code for the computer program itself.

To address the problem of changing static elements in a computer program, modern code development protocol calls for the use of external files, often referred to as resource or property files, to store the static elements of a computer program such as error messages. References to static elements can be incorporated in source code in lieu of the static element as a placeholder for the static elements. As described in U.S. Patent Application Publication No. U.S. 2002/0162093 A1 by Zhou et al. for INTERNATIONALIZATION COMPILER AND PROCESS FOR LOCALIZING SERVER APPLICATIONS, this technique has become prevalent where a computer program is to be globalized or nationalized to accommodate multiple different languages for different jurisdictions without requiring wholesale changes to the source code for an application. Rather, a mere change to the content of the external file can suffice. Moreover, providing different external files for different languages can provide for a multi-lingual application without requiring changes to the source code.

While the use of an external file for static elements of a computer program has proven to be an effective means for providing flexibility and extensibility for the computer program, coordinating code development without automated access to the external file can be distracting and awkward for the code developer. In this regard, though some code development platforms, including the ECLIPSE™ platform (ECLIPSE is a trademark of the Eclipse Foundation, Inc.) provide for logic enabled to remove static elements from source code and to place static elements in an external file, no comparable logic is provided to remove static elements from an external file and return those static elements to the proper position in the source code.

BRIEF SUMMARY OF THE INVENTION

Embodiments of the present invention address deficiencies of the art in respect to externally stored static elements for a document in a document editor and provide a novel and non-obvious method, system and computer program product for moving static elements for a document between an external file and the document in a document editor. A data processing system for moving static elements for a document between an external file and the document in a document editor can include an automated de-externalization and re-externalization processor coupled to a document editor. The automated de-externalization and re-externalization processor can include program code enabled both to replace static elements in a subject document with static element references while storing replaced static elements in entries in an external file, and also to replace static element references in the subject document with corresponding static elements stored in the entries in the external file.

Preferably, the automated de-externalization and re-externalization processor can include additional program code enabled to insert during de-externalization a replaced static element reference in the subject document within a comment tag in proximity to a corresponding static element in the subject document. As such, the automated de-externalization and re-externalization processor can include additional program code enabled to use during re-externalization a static element reference in a comment tag as a static element reference for a replaced static element.

In another embodiment, a computer implemented method of moving static elements for a document between an external file and the document in a document editor can include de-externalizing static element references in a subject document in a document editor by replacing the static element references in the subject document with corresponding static elements stored in entries in the external file. The method further can include re-externalizing static elements in the subject document in the document editor by replacing the static elements in the subject document with static element references while storing replaced static elements from the subject document in entries in an external file.

Re-externalizing the static text elements can include re-externalizing static text in source in a source code editor by replacing the static text in the source code with static text references while storing replaced static text from the source code in entries in an external file. De-externalizing the static text element references can include de-externalizing static text references in the source code in the source code editor by replacing the static text references in the source code with corresponding static text stored in the entries in the external file. De-externalizing the static element further can include, for each replaced static element reference, inserting the replaced static element reference in the subject document within a comment tag in proximity to a corresponding static element in the subject document. Likewise, re-externalizing the static element further can include, for each replaced static element, using a static element reference in a comment tag as a static element reference for the replaced static element.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for moving static elements for a document between an external file and the document in a document editor. In accordance with an embodiment of the present invention, an automated de-externalization process can be performed. In the automated de-externalization process, static element identifiers in a document can be replaced with corresponding static elements, such as text strings, which had been previously stored in a separate file in association with corresponding static element identifiers. Subsequently, in an automated re-externalization process, selected static elements within the document can be replaced with corresponding static element identifiers. Importantly, the corresponding static element identifiers can be identified within comment text in the document provided during the automated de-externalization process.

Figure 1:
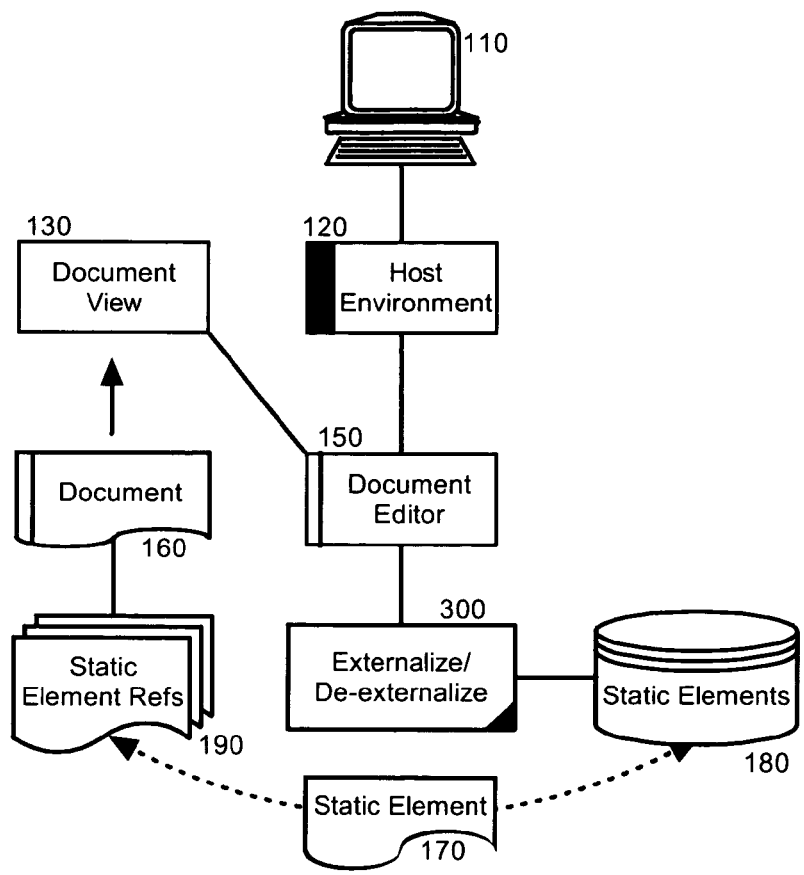
FIG. 1 is a schematic illustration of a data processing system configured for moving static elements for a document between an external file and the document in a document editor.

In more particular illustration, FIG. 1 is a schematic illustration of a data processing system configured for moving static elements for a document between an external file and the document in a document editor. The data processing system can include a host computing platform 110 having a host computing environment 120. The host computing environment 120 can host a document editor 150 in which a document 160 can be edited. In this regard, data can be added to, removed from or modified within the document 160 in the document editor 150. For example, the document editor 160 can be a source code editor in a source code development platform such as the ECLIPSE™ platform.

Notably, an automated de-externalization and complimentary re-externalization process 300 can be coupled to the document editor 150. During automated de-externalization, static element references 190 disposed in the document 160 can be located and replaced with corresponding static elements 170, such as text, imagery, and the like, which can be stored in a registry of static elements 180 in association with the static element references 190. Conversely during automated re-externalization, the static element references 190 can be disposed in the document 160 in place of corresponding static elements 170. The static elements 170, in turn, can be stored externally to the document 160 within the registry of static elements 180 in association with the static element references 190. In this way, one editing the document 160 can repeatedly and automatically de-externalized and re-externalized on command.

Figure 2:
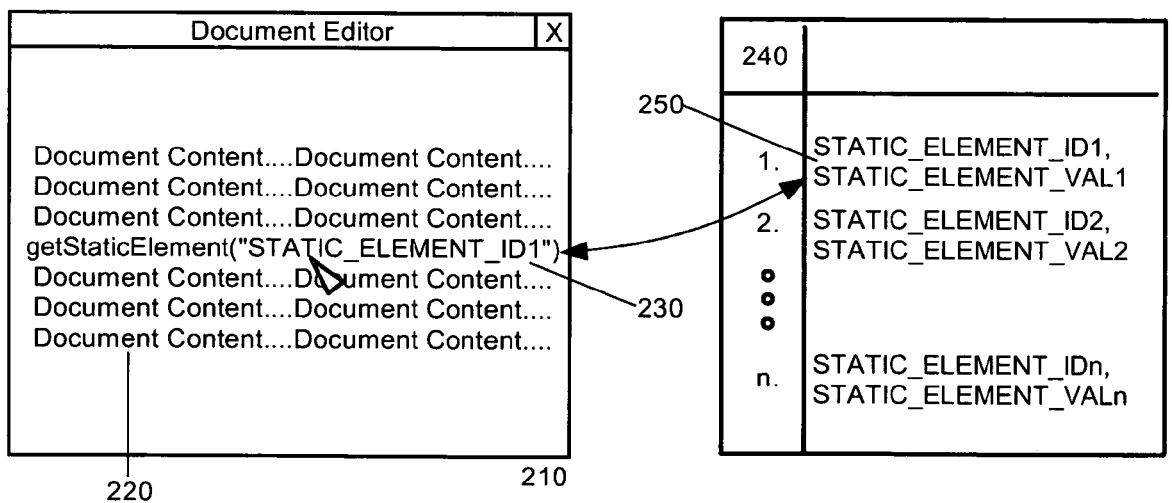
FIG. 2 is a pictorial illustration of a document editor configured for moving static elements for a document between an external file and the document in a document editor; and, FIG. 3 is a flow chart illustrating a process for moving static elements for a document between an external file and the document in a document editor.

For example, FIG. 2 is a pictorial illustration of a document editor configured for moving static elements for a document between an external file and the document in a document editor. As shown in FIG. 2, a document editor 210 can render document content 220 in a document for editing through the document editor 210. The document can include a static element reference 230 referencing a static element entry 250 stored separately from the document content 220 in a registry of static element references 240. Each static element reference entry 250 can include the static element reference 230 and a corresponding static element for the static element reference 230.

Figure 3:
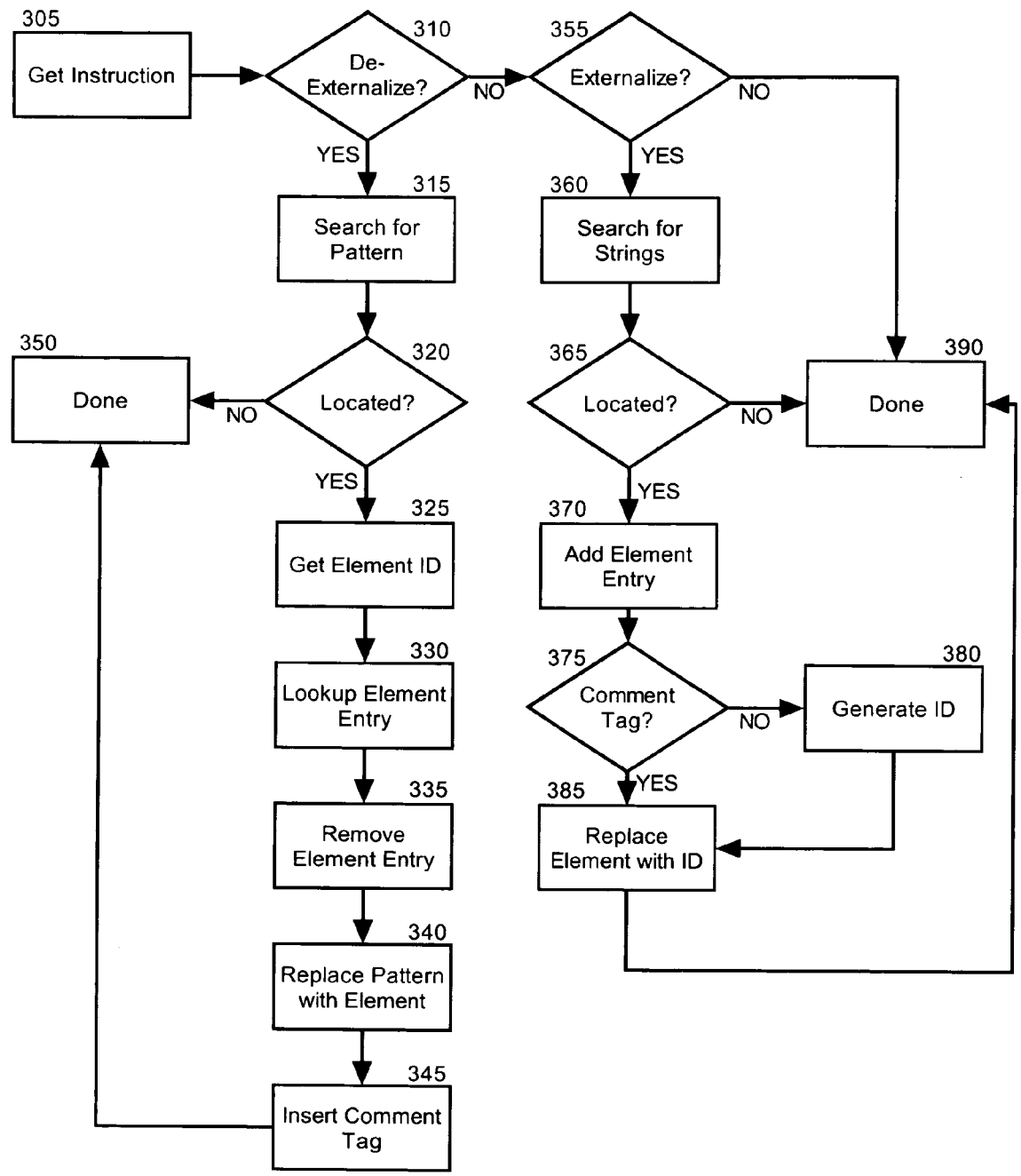

Turning now to FIG. 3, a flow chart is shown which illustrates a process for moving static elements for a document between an external file and the document in a document editor in the system of FIG. 1. Beginning in block 305, an instruction can be received which can include an automated de-externalize or an automated re-externalize instruction. In decision block 310, if the instruction is one to perform automated de-externalization, the process can continue through block 315. In decision block 355, if the instruction is one to perform automated re-externalization, the process can continue through block 360. Otherwise, the process can end in block 390.

First considering an automated de-externalization process, in block 315, a pattern can be selected for identification in the subject document. The pattern can be associated with an embedded directive to locate a static element associated with a static element reference specified with the embedded directive. If the pattern is located in the subject document in decision block 320, in block 325 the static element reference 325 can be retrieved from the subject document and in block 330, a corresponding static element corresponding to the static element reference can be located in an external file.

Subsequently, in block 335, the static element reference and corresponding state element can be removed from the external file and the embedded directive along with the associated static element reference can be replaced in the subject document with the corresponding static element in block 340. Finally, in a preferred embodiment, in block 345 the replaced embedded directive along with the associated static element reference can be inserted into the subject document as a commented tag to indicate that the static element can be externalized using the already established static element reference. Subsequently, the process can end in block 350.

Now considering the automated re-externalization process of FIG. 3, beginning in block 360, static elements, such as text strings, can be located within the subject document. In decision block 365, if a static element is located, in block 370, an entry for the static element can be added to an external file. The entry can include the static element in addition to a reference to the static element. In this regard, in decision block 375 it can be determined whether a commented tag can be located in proximity to the static element. If so, the commented tag can be retrieved and a static element reference can be extracted and used as the reference in the entry in the external file. Otherwise, a static element reference can be generated in block 380 and used in the entry in the external file. Finally, in block 385 the static element in the document can be replaced with the static element reference. Subsequently, the process can end in block 390.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, or semiconductor system (or apparatus or device). Examples of a computer readable storage medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A data processing system for moving static elements for a document between an external file and the document in a document editor, the data processing system comprising:
a host computing platform comprising a processor and memory;
an automated de-externalization and re-externalization processor coupled to a document editor executing in the memory by the processor of the host computing platform, and comprising program code enabled both to replace static elements in a subject document in the document editor with static element references while storing replaced static elements from the subject document in entries in an external file, and also to replace static element references in the subject document in the document editor with corresponding static elements stored in the entries in the external file;
wherein the automated de-externalization and re-externalization processor comprises additional program code enabled to insert during de-externalization a replaced static element reference in the subject document within a comment tag in proximity to a corresponding static element in the subject document and to use during re-externalization a static element reference in a comment tag as a static element reference for a replaced static element in an entry in the external file.

2. The system of claim 1, wherein the static elements are static text elements stored separately from source code.

3. The system of claim 1, wherein the document editor is disposed in a source code development platform.

4. A computer implemented method of moving static elements for a document between an external file and the document in a document editor, the method comprising:
de-externalizing static element references in a subject document in a document editor executing in memory by a processor of a host computing platform, by replacing the static element references in the subject document with corresponding static elements stored in entries in an external file; and,
re-externalizing static elements in the subject document in a document editor by replacing the static elements in the subject document with the static element references while storing replaced static elements from the subject document in entries in an external file;
wherein during de-externalization a replaced static element reference in the subject document is inserted within a comment tag in proximity to a corresponding static element in the subject document, and
wherein during re-externalization, for each replaced static element, a static element reference is used in a comment tag as a static element reference for the replaced static element in an entry in the external file.

5. The method of claim 4, wherein the re-externalizing of the static elements comprises re-externalizing static text in source code in a source code editor by replacing the static text in the source code with static text references while storing replaced static text from the source code in entries in an external file.

6. The method of claim 4, wherein the de-externalizing of the static element references comprises de-externalizing static text references in the source code in the source code editor by replacing the static text references in the source code with corresponding static text stored in the entries in the external file.

7. A computer program product comprising a computer readable memory storing computer readable program code for moving static elements for a document between an external file and the document in a document editor, the computer program product including:
computer readable program code for de-externalizing static element references in the subject document in the document editor by replacing static element references in the subject document with corresponding static elements stored in the entries in an external file; and,
computer readable program code for re-externalizing the static elements in a subject document in a document editor by replacing the static elements in the subject document with the static element references while storing replaced static elements from the subject document in entries in the external file;
wherein the computer readable program code for de-externalizing of the static element further comprises computer usable program code for inserting the replaced static element reference in the subject document within a comment tag in proximity to a corresponding static element in the subject document for each replaced static element reference,
wherein the computer readable program code for re-externalizing the static elements further comprises computer usable program code for using a static element reference in a comment tag as a static element reference for the replaced static element for each replaced static element in an entry in the external file.

8. The computer program product of claim 7, wherein the computer readable program code for re-externalizing of the static elements comprises computer readable program code for re-externalizing static text in source code in a source code editor by replacing the static text in the source code with static text references while storing replaced static text from the source code in entries in an external file.

9. The computer program product of claim 7, wherein the computer readable program code for de-externalizing of the static element references comprises computer readable program code for de-externalizing static text references in the source code in the source code editor by replacing the static text references in the source code with corresponding static text stored in the entries in the external file.

* * * * *